(12) United States Patent
Mishly

(10) Patent No.: US 12,082,718 B2
(45) Date of Patent: Sep. 10, 2024

(54) SYSTEM FOR EFFICIENTLY SUPPLYING, TRANSPORTING AND DISPENSING CONSUMABLE MERCHANDISE AND NOVEL RACKS THEREFOR

(71) Applicant: Shawn Shlomo Mishly, Herzliya (IL)

(72) Inventor: Shawn Shlomo Mishly, Herzliya (IL)

(*) Notice: Subject to any disclaimer, the term of this patent is extended or adjusted under 35 U.S.C. 154(b) by 482 days.

(21) Appl. No.: 16/632,690

(22) PCT Filed: Jul. 24, 2018

(86) PCT No.: PCT/IL2018/050821
§ 371 (c)(1),
(2) Date: Jan. 21, 2020

(87) PCT Pub. No.: WO2019/021281
PCT Pub. Date: Jan. 31, 2019

(65) Prior Publication Data
US 2020/0138207 A1    May 7, 2020

Related U.S. Application Data

(60) Provisional application No. 62/536,144, filed on Jul. 24, 2017.

(51) Int. Cl.
*A47F 5/00* (2006.01)
*A47B 45/00* (2006.01)
(Continued)

(52) U.S. Cl.
CPC ............ *A47F 5/0025* (2013.01); *A47B 45/00* (2013.01); *A47F 5/10* (2013.01); *B65D 19/44* (2013.01);
(Continued)

(58) Field of Classification Search
CPC ............ B65G 2209/02; B65G 2207/08; B65G 1/02; B65G 1/10; B65G 1/1373; B65G 1/1371;
(Continued)

(56) References Cited

U.S. PATENT DOCUMENTS 2,956,763 A * 10/1960 Arca ...................... B65D 19/12
211/195
3,502,227 A * 3/1970 Schell, Jr. .............. A47B 87/02
211/194
(Continued)

FOREIGN PATENT DOCUMENTS

CN    2410267 Y    12/2000
CN    2543901 Y    4/2003
(Continued)

OTHER PUBLICATIONS

International Search Report for International Application No. PCT/IL2018/050821 Completed Mar. 7, 2019; Mailed Mar. 21, 2019 3 pages.
(Continued)

*Primary Examiner* — Patrick D Hawn
(74) *Attorney, Agent, or Firm* — Bruce A. Lev

(57) ABSTRACT

The invention relates to E-commerce in consumable goods, such as groceries, which is intended to supplement or substitute for diversified retail stores, such as supermarkets. In a first aspect, the invention is of a portable rack, mountable on a load pallet and structured to comprise one or more compartments, arranged one above the other. Each compartment is configured to hold one or more containers, containing goods, and includes a plurality of carry rails, disposed to collectively carry the containers so as to enable lifting each container horizontally out of the compartment. In a second aspect, the invention is of an E-commerce system, for supplying fast moving consumer goods in response to customers' orders, that utilizes an integrated computer network
(Continued)

and portable racks in order to increase operating efficiency, reduce required inventory size of each product, shorten supply time and enable offering of a larger variety of products.

14 Claims, 8 Drawing Sheets

(51) Int. Cl.
    *A47F 5/10*           (2006.01)
    *B65D 19/44*         (2006.01)
    *B65G 1/02*          (2006.01)
    *G06Q 10/083*       (2023.01)
    *G06Q 10/0833*     (2023.01)

(52) U.S. Cl.
    CPC .............. *B65G 1/02* (2013.01); *G06Q 10/083* (2013.01); *G06Q 10/0833* (2013.01); *B65D 2519/00815* (2013.01); *B65G 2207/08* (2013.01); *B65G 2209/02* (2013.01)

(58) Field of Classification Search
    CPC .......... B65D 2519/00815; B65D 19/44; G06Q 10/083; G06Q 10/0833; A47B 45/00; A47F 5/0025; A47F 5/10
    USPC ................................................ 211/188, 194
    See application file for complete search history.

(56) References Cited

U.S. PATENT DOCUMENTS

| | | | |
|---|---|---|---|
| 3,628,807 A | | 12/1971 | Fullington et al. |
| 3,739,921 A | * | 6/1973 | Schmidt .................... F16B 7/00 432/261 |
| 3,850,295 A | | 11/1974 | Black |
| 4,673,092 A | | 6/1987 | Lamson et al. |
| 4,703,702 A | * | 11/1987 | Speicher ............. B65D 19/385 108/52.1 |
| 4,773,547 A | * | 9/1988 | Bell ......................... B65G 1/02 108/53.1 |
| 4,790,707 A | | 12/1988 | Magretta et al. |
| 5,190,171 A | * | 3/1993 | Christman, Jr. ... A47B 87/0246 211/186 |
| 5,452,811 A | * | 9/1995 | Taravella ................. A47F 5/137 211/186 |
| 6,135,299 A | * | 10/2000 | Burgess .................. B62B 3/006 211/150 |
| 6,783,012 B2 | | 8/2004 | Webb |
| 7,152,749 B2 | * | 12/2006 | Beck ...................... B65D 19/44 206/335 |
| 7,802,526 B2 | * | 9/2010 | Brady .................... B65D 19/12 108/53.5 |
| 7,967,157 B2 | * | 6/2011 | Bilotto ...................... A47F 5/12 211/182 |
| 7,997,213 B1 | * | 8/2011 | Gauthier .............. B65D 88/022 294/67.1 |
| 8,511,495 B2 | * | 8/2013 | Grigsby ................. B65D 85/68 206/335 |
| 8,857,634 B2 | * | 10/2014 | Harris ................... A47B 47/021 211/188 |
| 8,955,700 B2 | * | 2/2015 | Barber ...................... A47F 7/04 211/23 |
| 9,171,278 B1 | * | 10/2015 | Kong ..................... B65G 1/137 |
| 9,492,009 B2 | * | 11/2016 | Naka ...................... A47B 57/32 |
| 9,551,987 B1 | | 1/2017 | Mountz et al. |
| 10,336,356 B2 | * | 7/2019 | Dyson ...................... B62B 3/02 |
| 10,952,533 B2 | * | 3/2021 | Lert, Jr. ............. A47B 47/0091 |
| 10,954,065 B2 | * | 3/2021 | Schroepf ............. G06Q 10/083 |
| 11,072,495 B2 | * | 7/2021 | Liu .......................... B25J 9/162 |
| 2003/0196972 A1 | | 10/2003 | Webb |
| 2004/0245200 A1 | | 12/2004 | Jersey et al. |
| 2006/0196842 A1 | | 9/2006 | Taylor et al. |
| 2006/0213402 A1 | * | 9/2006 | Grimal ................... B65D 19/44 108/51.11 |
| 2015/0001169 A1 | * | 1/2015 | Chen .................. A47B 87/0223 211/188 |
| 2016/0260158 A1 | | 9/2016 | High |

FOREIGN PATENT DOCUMENTS

| | | |
|---|---|---|
| CN | 1498832 A | 5/2004 |
| CN | 105775541 A | 7/2016 |
| CN | 106037278 A | 10/2016 |
| CN | 206166419 U | 5/2017 |
| JP | H07315380 A | 12/1995 |
| WO | 2017113001 A1 | 7/2017 |

OTHER PUBLICATIONS

Written Opinion for International Application No. PCT/IL2018/050821 Completed Mar. 7, 2019; Mailed Mar. 21, 2019 5 pages.
International Preliminary Report on Patentability for International Application No. PCT/IL2018/050821 Mailed Sep. 9, 2019 70 pages.

\* cited by examiner

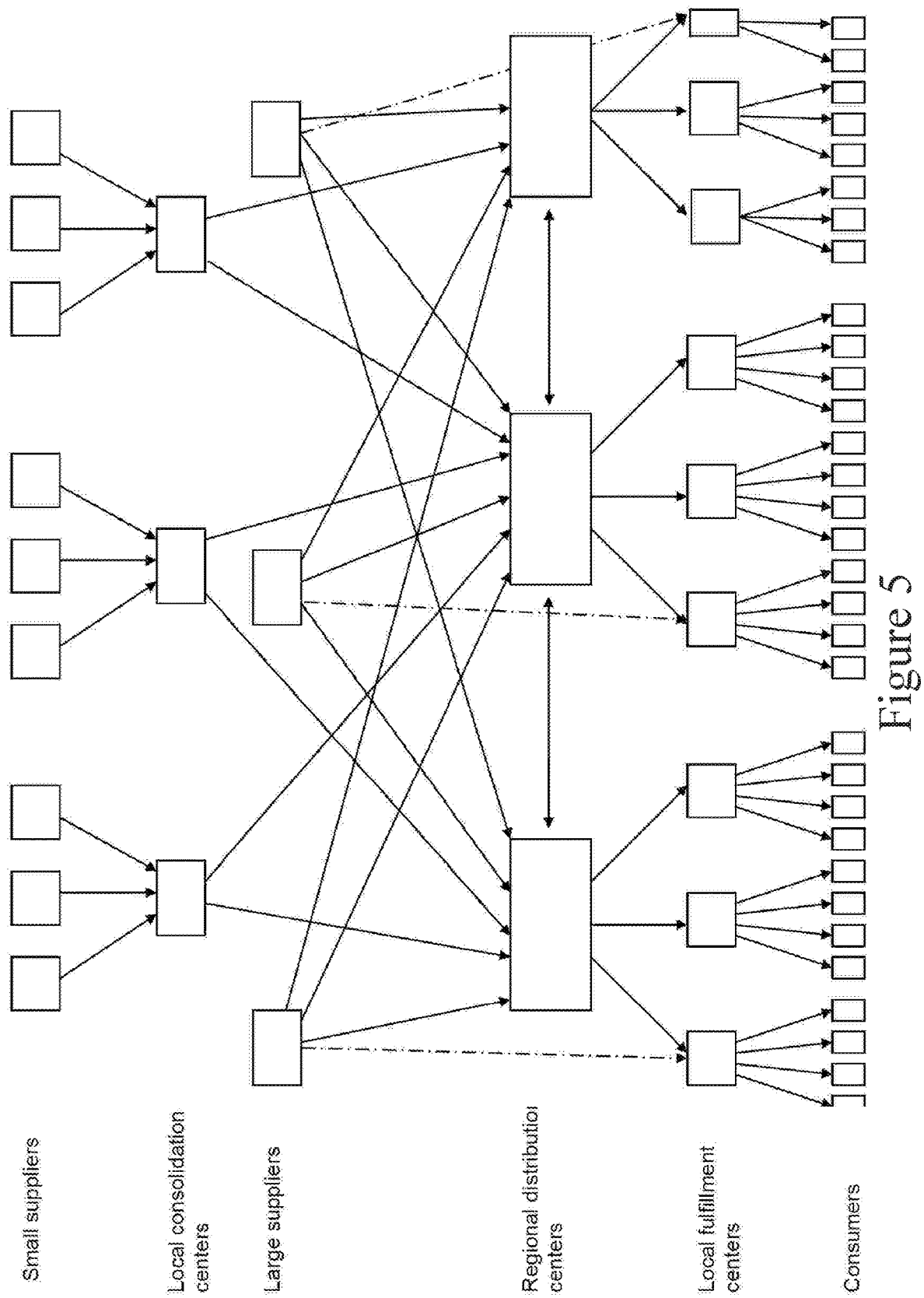

SYSTEM FOR EFFICIENTLY SUPPLYING, TRANSPORTING AND DISPENSING CONSUMABLE MERCHANDISE AND NOVEL RACKS THEREFOR

RELATED APPLICATIONS

This application is a National Phase of PCT Patent Application No. PCT/IL2018/050821 having International filing date of Jul. 24, 2018, which claims the benefit of priority of U.S. Provisional Application No. 62/536,144 filed on Jul. 24, 2017. The contents of the above applications are all incorporated by reference as if fully set forth herein in their entirety.

TECHNICAL FIELD

The invention relates generally to so-called E-commerce, namely to systems for fulfilling retail orders received digitally from consumers. It relates particularly to E-commerce in consumable goods, also referred to as Fast Moving Consumer Goods (FMCG), such as groceries, which is intended to supplement or substitute for diversified retail stores, such as supermarkets.

BACKGROUND ART

A conventional FMCG E-commerce system is generally operated by a merchandizing company, e.g. a supermarket chain, and is largely modelled similarly to a conventional retail system, in that it retains the conventional structure of supply and distribution; the only significant difference is that it includes fulfillment centers in place of, or in addition to, conventional retail stores; a fulfillment center may serve a region that has been served by several retail stores. In this structure, inventory at the local outlet (i.e. the retail store or the fulfillment center) is controlled only by tracking actual depletion and statistically predicting needs, without regard to current outstanding orders. Products are accordingly shipped from the suppliers or from distribution centers in relatively large batches and are thus stored at the local outlet—first in a storage area and then on shelves or in bins—for picking by the consumers or by the order-filling facility.

A fulfillment center, under current art, may involve various degrees and proportions of manual, mechanized and robotic operations—both in stocking the shelves and in filling orders. In some systems, bins are stocked at a stocking station or a storeroom and are placed on the shelves by an automatic conveyor mechanism; yet the stocking process itself, which involves moving goods from their wholesale containers (e.g. cartons) into the bins, still requires a considerable amount of manual labor, as well as relatively elaborate conveyance equipment.

Another drawback of conventional fulfilment centers lies in the very use of shelves to hold the merchandise. Shelf structures are inherently inflexible and do not readily lend themselves to adapt to variations in the stock that occur periodically (e.g. seasonally or daily or according to supplier delivery cycles) or in gradual shifts (due, for example, to consumption trends or new products development). Such variations may include (1) the number of units of any one item to be optimally stocked, (2) the proportions of stocked items of various sizes, (3) the total number of offered products. Permanently structuring the shelves so as to allow for such variations results in waste of space.

All-in-all, current E-commerce systems for consumable products share with conventional retail systems the following drawbacks:

(a) The relatively large number of units of each product that need to be stored at the local outlet requires large real-estate area, as well as large shelf space—which is costly. In the case of a fulfillment center, the large number of units of each product that need to be stored at the order-filling facility, make the size of this facility relatively large—increasing its cost of constuction and reducing the possible speed of order filling by any given means.

(b) Both types of outlets require a relatively large amount of labor to place products on the shelves and to frequently reposition them when adding offered products.

(c) The number of different products offered by the local outlet, as well as by the system as a whole, is limited to relatively high-demand items, since they are set up to receive goods from wholesale suppliers in bulk quantities. Thus they cannot offer to their customers products that are in relatively rare demand or that come in a large variety, as these would become, at the current setup, either overstocked (wasting space) or out of stock (causing customer dissatisfaction). Adding such products to the offerings may also present these outlets with unsurmountable logistical problems.

(d) The system requires relatively long shelf life for each product. For inherently fresh products (e.g. dairy and produce) this may result either in large wastage or may require that the products be treated by their suppliers for long shelf life—which generally reduces their quality (e.g. in terms of taste or of health hazards) to the consumer.

DISCLOSURE OF THE INVENTION

In a first aspect, the invention is of a portable rack (previously referred to, variously, as a frame or a stack), which is preferably mountable on a load pallet and whose horizontal outer dimensions do not exceed those of a standard pallet. The rack is structured to comprise one or more compartments (previously referred to as "supplier-to-dispenser crates" or "S2D crates"), arranged one above the other. Each compartment is configured to hold one or more containers, containing goods, and includes a plurality of carry rails, disposed to collectively carry the containers, preferably side by side, and configured so as to enable lifting each container from its bottom and drawing it horizontally out of the compartment.

A container in the present context is any container, such as a box or a carton or any other packaging means, that contains a plurality of instances (i.e. units) of a given product (also referred to collectively as goods), as originally packed by their supplier. The three dimensions of any container held within a compartment may assume any value, up to a given maximum; that is, any compartment may hold simultaneously containers of various sizes and shapes. Optionally, the several compartments within a rack may mutually differ in height—allowing the holding of containers having commensurately different maximum heights.

When the rack is used in a fulfillment center (as described below), any container held therein may have had its top- or front side removed—to enable retrieval of product units from therein by a picking device or person.

The portable rack according to the invention is generally configured to be used in an E-commerce system for supplying fast moving consumer goods in ways that overcome the drawbacks of conventional systems, as outlined above. Within such a system the rack may be used at various stations of the supply chain, such as a consolidation center, a regional distribution center or a fulfillment center, as well as in transporting the goods between such stations. Preferably, any one rack may serve to hold and transport containers within and between at least two such stations. The portable rack may, furthermore, be used at any such station for cross-docking—that is, for moving into it containers that have arrived from several different suppliers or for moving out of it containers that are destined for several different locations further down the supply chain.

In a fulfillment center the portable rack may be used to hold containers in place for accessing and picking product units when filling orders. It is noted that such use, instead of fixed shelves, holding bins, may advantageously save labor (in that original containers are used, thus avoiding the necessity to load goods into the bins), as well as save space in the order filling facility and increase operational efficiency (as explained below). Moreover, the portable rack may be moved with its contents from a storage area to the order filling facility, thus further saving labor. A portable rack may also be used in the fulfillment center to hold collection boxes, i.e. boxes used each to accumulate picked items to fill a particular order, as well as to transport packages of filled orders to customer locations.

The manner in which the portable rack serves these various functions, as well as the advantages of its utilization in such a system, will be further apparent from the summary description of the system, to follow, as well as from the detailed operational description below.

The invention contemplates embodiment of the portable rack in several configurations, to be fully described below. Preferably the rack is constructed so that each compartment is structured as a three-dimensional rectangular frame, consisting of structural members along its edges; the bottom structural members define a horizontal base frame, to which the carry rails are attached. More preferably, the rack, when empty, is foldable for compact shipping back to a supplier. Alternatively, the structural members are instances of a limited set of component types, such as a foldable base frame and vertical posts, of various lengths, as well as the carry rails—all of which may be manually assembled without fasteners and manually disassembled. In order for the rack to be truly portable, it is provided with lateral retention bars so as to prevent containers within any compartment from sliding out sideways.

In a first configuration of the preferable structure, the rack as a whole is structured integrally, wherein a compartment is geometrically defined by its base frame and its vertical posts. A multi-compartment rack is assembled by placing the bottom compartment on a pallet and attaching the base plate of each other compartment to the top ends of the vertical posts of the compartment below it.

In a second configuration of the preferable structure, each compartment is structured as an independent unit and includes, in addition to the base frame and the vertical posts, a top frame, which is generally similar to a base frame. A multi-compartment rack is assembled by placing the bottom compartment on a pallet and then placing additional compartments on top of it. Preferably the compartments are configured so that any compartment may be lifted (together with the ones above it) off the rack by a fork lift or similar device. This configuration may be advantageously utilized in the system for cross-docking compartments (with their entire contents of containers), that is—assembling a rack from goods-containing compartments that have arrived from various sources, as well as disassembling a rack into goods-containing compartments that are destined for various locations.

In a second aspect, the invention is of an E-commerce system, for supplying fast moving consumer goods in response to customers orders, that utilizes an integrated computer network and portable racks, such as described above, in order to increase operating efficiency, reduce required inventory size of each product, shorten supply time and enable offering of a larger variety of products—thus overcoming the drawbacks of conventional systems, as outlined above.

The system encompasses most of the supply chain—from suppliers' warehouses or stores, through local consolidation centers (CC for short) and regional distribution centers (DC for short) to local fulfillment centers (FC for short). Additionally there are provided local consolidation centers; each typically serves to receive goods from nearby, generally small, suppliers and to ship them, in common, to any distribution center or, where expedient, to a local FC. The computer network (CN for short) includes a central computer, with suitable software, and terminals throughout the supply chain and is operative to track each customer order, to track inventory at each station of the supply chain and to control the movement of each container within and between the stations, as well as to control order filling operation—all in a manner that maximizes efficiency and minimizes inventory and supply time.

The system preferably distinguishes between products in frequent demand, which may be held in stock and for which customers' orders may be filled immediately, and specialty products or other products with sporadic demand, which must be back-ordered and which may be delivered to customers within, say, 24 hours; the latter will be referred to as non-stockable products. As will be shown, the movement of even products of the first type, which are those generally offered also by conventional retail systems, may be controlled by the system so as to make more frequent deliveries of smaller batches—which advantageously reduces the required inventory at the FC, as well as the supply time, and therefore the required shelf life, of the products. Beyond this, however, the system uniquely manages movement of products of the second type (i.e. non-stockable products, largely not offered by conventional retail systems) for filling orders within 24 hours, without the need to keep inventories at the FCs or the DCs, as will be explained below.

The thus controlled movement of goods is carried out generally in terms of individual containers moving within and between stations—which is facilitated by the portable racks (PR for short) of the present invention. In particular, specific containers arriving at a distribution center—possibly already held in PRs—from various suppliers or from various consolidation centers may be moved, according to directions from the CN, into a common PR, which is then transported to a specified fulfillment center or to another DC.

Similarly, specific containers arriving at a consolidation center from various (small) suppliers may be moved, according to directions from the CN, into a common PR, which is then transported to a specified DC. It is noted that this ability is particularly adapted to specialty- and sporadically demanded products (i.e. those of the second type mentioned above), which are usually offered by small suppliers; it thus enables offering the consumer a larger variety of products, unlike conventional retail systems, which are set up to receive and manage only bulk shipped products. Optionally, a plurality of different products of the second type, offered by any small supplier and destined for any one FC, may be packed in a single common container; the CN is operative to track the identity of such products and of the container all the way to the order filling facility—thus making the unique ability of the system to offer such products even more efficient.

When portable racks of the second configuration, i.e. with independently movable compartments, are utilized, the CN may also issue directions to move compartments from one PR to another (usually when all containers therein have a common destination). This ability may save time and labor.

At a fulfillment center, portable racks arriving from the corresponding DC are generally placed at its local storage facility. All containers in these PRs with ordered products of the second type may be immediately transferred to other PRs (or possibly remain on the same PR) which may then be placed at the order-filling facility (at a position directed by the CN). Whenever necessary, under direction of the CN, containers with products of the first type may generally be transferred from the FC's local storage to other PRs—to similarly be placed at the order-filling facility. It is noted that this ability reduces the amount of product units held at the order filling facility to just those required by currently outstanding orders—thus reducing its size and its operating expenses; this ability also reduces the amount of labor involved in stocking the facility (as compared with conventional fulfillment centers, where bins on shelves are generally stocked manually). The position of each PR, as directed by the CN, may not necessarily be by product categories but rather, for example, according to available space or in anticipation of a desired order filling sequence. This does not detract from the ability to locate each specific container for order filling (since all the relevant information is known to the CN) but enables further compactness of the facility or efficiency in the order picking process.

As part of an order filling process, the CN is operative to issue directions to the order-filling facility to temporarily withdraw a specified container from a specified PR, to pick a specified number of units of a product therefrom and to place them in a collection bin or—box designated for the order.

Optionally, the CN is operative to track positions of individual units within a container. It may then instruct a picking device or -person to pick a particular unit from a temporarily retrieved container. For robotic systems this ability may be utilized advantageously in any of two ways: (1) When all units in a container are similar (i.e. of the same product), the CN may keep track of the depletion process and may direct the picking device to the next unit in queue; this may obviate the need for a sensor in the picking device for identifying and locating the units. (2) When some units in the container are different from others, which would be the case for products of the second type, the picking device may thus be directed to the correct product.

Another possible use for PRs within an order-filling facility, according to the present system, is to temporarily hold in them collection bins or -boxes. This would enable temporarily interrupting the order filling process while waiting for a particular product to arrive from its supplier; this is particularly akin to products of the second type, where a 24-hours fulfillment period is allowed.

Yet another possible use of PRs according to the invention is for transportation of packaged filled orders from the FC to customers' premises. As directed by the CN, packages may be placed in specific PRs according to corresponding delivery routes.

More specifically, the invention is, in one aspect—
a portable rack for holding and transporting one or more containers, containing goods, the rack comprising one or more compartments, each compartment including a plurality of carry rails, disposed and configured to collectively carry one or more of the containers, side by side, so as to enable lifting each container from its bottom and drawing it horizontally out of the compartment. The rack is generally configured to be placeable on a load pallet, wherein the horizontal dimensions of the rack do not exceed the corresponding dimensions of a standard load pallet.

Preferably each of the carry rails includes a protrusion at each of its ends, configured to prevent forward- or backward sliding of any container carried thereon.

The rack generally has a plurality of compartments, wherein the heights of any two compartments may differ from each other. In some configurations it is structured as a three-dimensional frame that includes a horizontal frame at the bottom of each compartment, each horizontal frame being configured to have a plurality of the carry rails attached thereto. Preferably the frame is foldable to become essentially flat.

In another aspect, the invention provides a multipurpose, portable, dismountable, adjustable dynamic shelving rack 10 for holding, transporting and enabling extracting therefrom a plurality of containers holding goods, the rack 10 comprising one or more compartments, each compartment comprising: (a) two rectangular horizontal frames 12, a lower frame designed to serve as a basis for holding said containers, wherein said lower frame may serve as a top frame for a compartment located below said compartment, and/or the top frame of the compartment may serve as a lower frame for a compartment located above said compartment; (b) four or more height adjustable vertical posts 13, designed to connect two adjacent frames 12, and adjust the distance therebetween according to the height of said containers; (c) a plurality of carry rails 14, mounted at least on said lower frame 12, serving as basis for carrying said containers, each carry rail 14 adapted to be moved horizontally such that the distance between two adjacent rails 14 is adjustable according to the width of the containers placed upon, and each carry rail 14 comprises a protrusion at both its ends configured to prevent forward and backward sliding of any container placed thereon; and (d) one or more lateral retention bars 16, mounted externally connecting said two or more frames 12 to prevent movement thereof while retaining containers placed on said plurality of carry rails 14, wherein: (i) assembled two frames 12, comprising a plurality of carry rails 14 on the bottom frame, with four vertical posts 13 form a single rectangular compartment for holding containers; (ii) the perimeter of the frame 12 fits the perimeter of a pallet thereby enabling placement thereon; (iii) the heights between the frames 12 within an assembled rack 10 (i.e. the height of the compartments) may differ across the rack; (iv) each one of said plurality of carry rails 14 has an upper surface onto which the container(s) is placed, wherein said upper surface is higher than the frame 12 onto which the rails are placed, to enable lifting the container on and off therefrom; and (v) the distance between two adjacent carry rails 14 may differ between frames and within the same frame.

In some configurations of the rack each compartment is structured as a three-dimensional rectangular frame, including structural members along its edges, the bottom structural members defining a horizontal base frame, to which the carry rails are attachable. Preferably each compartment is further structured so that it may be assembled without fasteners from a set of components, which include the base frame and vertical posts. More preferably the base frames are foldable and the lengths of the vertical posts may assume any of a plurality of values.

In alternative configurations, the rack 10 of the invention further comprises fasteners for affixing the frame(s) 12 to the vertical posts 13 and/or affixing one compartment to another.

In some configurations of the rack each compartment is structured to also include a horizontal rectangular top frame, essentially similar to the base frame, and is configured to be transportable as a unit, stackable on a similar compartment or on a load pallet. Preferably the base frame and the top frame of each compartment are foldable. Generally the compartments are stacked one above the other and are configured so that any compartment or group of vertically stacked compartments may be lifted from the rack and placed on top of similar compartments of another rack or on a separate load pallet.

The rack, in any configuration, may further comprise one or more lateral retention bars for retaining containers while in ransport.

The rack, in any configuration, is adaptable to be utilized, in a supply chain for consumable goods, for at least two of the functions in the set that includes (a) storage of containers, containing goods, at any station of the supply chain, (b) consolidation of goods from multiple sources in the supply chain, (c) cross-docking of goods, (d) distribution of goods to any station of the supply chain, (e) picking of goods to fulfil customer orders and (f) transportation of goods between any of the stations of the supply chain. The set may further include (g) transportation of packed goods from a fulfillment center to a customer's premises.

In certain embodiments of the rack 10 according to any of the embodiments above, the frames 12 with carrying rails 14 are stacked one above the other (separated with vertical posts 13) generating compartments, and are configured so that any frame 12/compartment, group of stacked frames/compartments, optionally with load/containers, may be lifted away from the rack 10 (and placed on top of similar frames of another rack 10 or on a separate pallet).

In further embodiments of the rack 10 according to any of the embodiments above, the vertical posts 13 are attachable and detachable to each one of said two or more frames 12.

In yet other embodiments, the rack 10 according to any of the embodiments above, further comprises a guiding element 18 for assisting in the attachment of each one of said vertical posts 13 to said frames 12.

In specific embodiments of the rack 10 of the invention, four of said vertical posts 13 are permanently connected to each one of said two or more frames 12. In a further specific embodiment, the vertical posts 13 are foldable into said frame 12 (see e.g. the top frame 12 in FIG. 6), such that when the rack 10 is not assembled, the vertical posts 13 are folded inside the frame to save storage room, and before assembly, they are extracted.

In certain embodiments of the rack 10 according to any of the embodiments above, each frame 12 is assembled from two pairs of complementary fragments 12a,12b.

In another aspect of the invention, the rack 10 is adapted to be utilized in a supply chain for consumable goods, for at least two of the following functions: (a) storage of containers containing goods, at any station/point of the supply chain, (b) consolidation of goods from multiple sources in the supply chain, (c) cross-docking of goods, (d) distribution of goods to any station of the supply chain, (e) picking of goods to fulfil customer orders and (f) transportation of goods between any of the stations/points of the supply chain.

The set may further include (g) transportation of packed goods from a fulfillment center to a customer's premises.

In another aspect, the present invention provides the use of a rack 10 as defined above in a supply chain for consumable goods, wherein said supply chain comprises at least two of the following stations/points: (a) storage of containers containing goods, at any station/point of the supply chain; (b) consolidation of goods from multiple sources in the supply chain; (c) cross-docking of goods; (d) distribution of goods to any station of the supply chain; (e) picking of goods to fulfil customer orders; and (f) transportation of goods between any of the stations/points of the supply chain. In specific embodiments, the supply chain further includes: (g) transportation of packed goods from a fulfillment center to a customer's premises In another aspect the invention is— a system for fulfilling orders, obtained digitally from consumers, for products offered by a plurality of suppliers, at least one unit of each product being packaged by the respective supplier in a container, the system comprising at least one distribution center, for receiving containers from a plurality of suppliers, and at least one fulfillment center, for receiving containers from a distribution center or from a supplier and for picking units of products from the containers by a person or by picking means and sending the units to customers according to their respective orders, wherein the system further comprises a plurality of portable racks, disposed in any of the distribution centers and in any of the fulfillment centers and being transportable between them, each portable rack including one or more compartments, each configured to hold one or more of the containers and to enable placing containers into it and to remove containers therefrom, and wherein the system further comprises a computer network, responsive to the orders from consumers and operative—

(a) to issue directions to a distribution center, to effect loading into a specified compartment of a specified first portable rack one or more specified containers from a specified compartment of a specified second portable rack or from a specified batch of containers received from a supplier and to effect shipping the first portable rack to a specified fulfillment center; and (b) to issue directions to a fulfillment center, to effect placing a specified portable rack at a specified position, generally accessible to the person or picking means, and to effect making a specified container in a specified compartment of a specified portable rack temporarily accessible to the person or picking means for picking a specified number of units therefrom.

In certain embodiments, the present invention provides a system for fulfilling shopping orders obtained digitally from consumers, for products offered by a plurality of suppliers, at least one unit of each product being packaged by the respective supplier in a container, the system comprising: (i) at least one distribution center, for receiving pre-packed containers from a plurality of suppliers, (ii) at least one fulfillment center, for receiving said pre-packed containers from said distribution center or directly from a supplier, and for picking units of products from said containers and sending said units to customers according to their respective orders, (iii) a plurality of portable dismountable adjustable dynamic shelving racks 10 as defined in claim 1, disposed in said distribution centers and in said fulfillment centers and being transportable between them, wherein said pre-packed containers are designed to be placed onto said racks 10 within said compartments, and (iv) a computer network/ system, responsive to said orders from consumers and operative to: (a) issue directions to a distribution center, to effect loading into a specified compartment of a specified first rack 10 one or more specified containers or units from a specified compartment of a specified second rack 10 or from a specified batch of containers received from a supplier and to effect shipping said first rack 10 to a specified fulfillment center; (b) issue directions to a fulfillment center, to effect placing a specified rack 10 at a specified position, and to effect making a specified container in a specified compartment of a specified rack 10 temporarily accessible for picking a specified number of units therefrom; and (c) docketing and managing inventory in terms of amount, designated location and organization through the entire procedure.

The system may further comprise at least one consolidation center, for receiving containers from a plurality of suppliers, wherein any of the portable racks are further disposed in the consolidation center and the computer network is further operative to issue directions to a consolidation center to effect loading into a specified compartment of a specified portable rack one or more specified containers received from a respective supplier and to effect shipping the portable rack to a specified distribution center.

When the compartments in the portable racks are configured as structurally independent units, the computer network may be further operative to issue directions to any of the centers to move a specified compartment, or group of vertically stacked compartments, from a first specified portable rack to a second specified portable rack.

In specific embodiments of the system according to any of the embodiments above, the computer network/system is further operative to issue directions to any of the suppliers, distribution center, fulfilment center and consolidation center, to move one or more specified containers and/or compartment(s), and/or group of vertically stacked compartments, from a first specified rack 10 to a second specified rack 10 and/or of at least one specified container from one compartment to another in the same rack 10.

In some configurations of the system the position of each unit within any container may be made known to the computer network and the computer network is further operative to issue directions to a fulfillment center to effect picking of a specified unit from a specified container. Furthermore, any unit within a container may be of a different product than another unit within the container.

In some configurations of the system, the position of each unit or container at a specified compartment is known to the computer network/system, and the computer network/system is further operative to issue directions to a fulfillment center to effect picking of at least one specified unit from a specified container. Further, each container within the rack 10 may comprise units of different product type,

BRIEF DESCRIPTION OF DRAWINGS

FIG. 5 is a schematic diagram of a goods supply chain to which the invention applies.

BEST MODE FOR CARRYING OUT THE INVENTION

Embodiments of portable racks according to the present invention will now be described by way of examples and with reference to the drawings.

Figure 1:
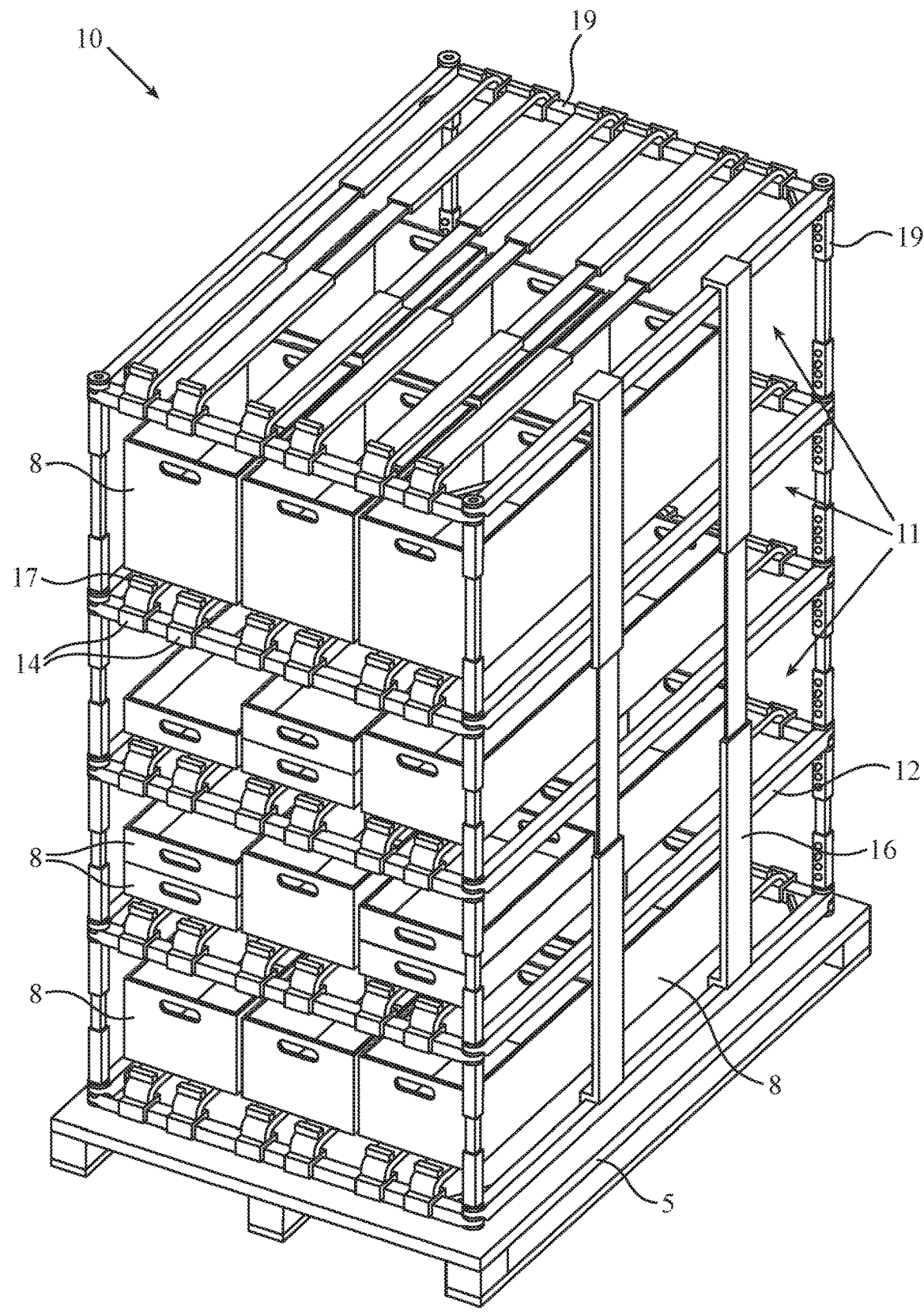
FIG. 1 is a trimetric view of a portable rack according to the invention in a first configuration, showing an exemplary arrangement of containers held in compartments therein.

FIG. 1 depicts a typical portable rack 10 in a first configuration—fully assembled from components as described below. It is seen to consist of compartments 11, disposed one above the other. The lowest compartment rests on a load pallet 5 (also known as skid), such as commonly used for transporting stackable goods. Preferably the pallet 5 is of a standard size, e.g. 120×100 cm. In any case, the maximum horizontal dimensions of the portable rack do not exceed those of the pallet and are preferably close to it. There is no inherent limitation on the height of the portable rack or the number of compartments.

The rack 10 of FIG. 1 is basically structured as a three-dimensional hollow frame 19, having vertical and horizontal members. The horizontal members form horizontal frames 12, defining the compartments 11 sequentially between them. The height of each 'cp (i.e. the distance between vertically adjacent horizontal frames) may have any value, which, moreover, may very among the 'cps in a rack. Each compartment 11 notably also includes several carry rails 14, attached to its respective bottom (base) frame 12 and disposed in parallel horizontally along the depth dimension of the compartment. As seen in FIG. 1, the carry rails 14 are configured to carry containers 8 placed into the compartment, without limitations on the number and sizes of the containers, up to a maximum, dictated by the inner dimensions of the compartment. Each carry rail 14 is shaped so that a gap is formed between its top surface and the top surface of the base frame 12. This gap permits the insertion of human fingers or of a fork of a lifting device (such as a fork-lift or a robotic handler) under any container resting on the rail so as to lift it off the rail and to remove it horizontally through the front or the back of the compartment. This gap likewise permits introducing containers into the compartment and lowering them to rest on the rails. Each rail 14 is preferably also formed to include a protrusion 17 at each of its ends, which serves to prevent the containers from sliding out forwards or backwards. In addition, the rack 10 is preferably provided with vertical lateral retention bars 16, attached to its top- and bottom horizontal frames and serving to retain the containers carried therein, that is—to prevent them from sliding out sideways while the rack is in transport, i.e. ported within any station or carried in a truck between stations.

Figure 2:
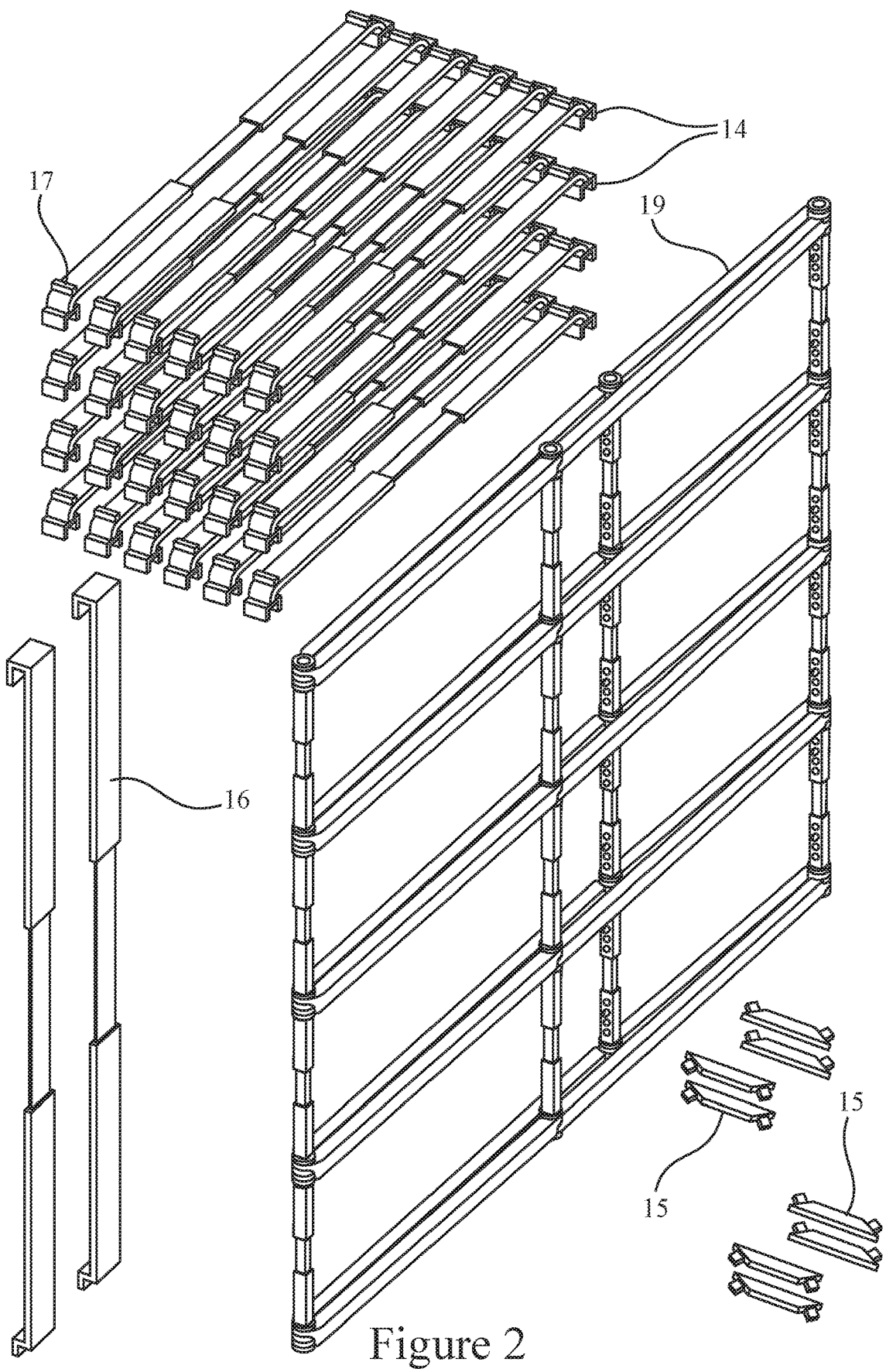
FIG. 2 is a trimetric view of the components of the rack of FIG. 1.

As shown in FIG. 2, the rack of FIG. 1, when empty, preferably lends itself to be disassembled—for compact transportation. The frame 19 is foldable, to become essentially flat. As seen here, beside the carry rails 14 and the retention bars 16, the components also preferably include braces 15, which, when assembled with the fame 19 (FIG. 1), serve to retain it in rectangular shape.

Returning now to FIG. 1, it illustrates the placement of various containers 8 in each compartment. The containers are generally those shipped by the suppliers, with goods packed therein, but may also be special containers, to store individual product units (as described below). As noted, they may have any size and shape within the bounds of the compartment. If their depth dimension is half that of the compartment, or less, two containers may be placed one behind the other, one being accessible from the front of the portable rack and one—from its back. Some, relatively flat, containers may be placed on top of each other within any one compartment. When the portable rack is used in a fulfillment center, containers may have had their tops removed, so as to make product units within them accessible to picking means; alternatively, for certain types of picking means, the fronts of the containers may have been removed.

Figure 3A:
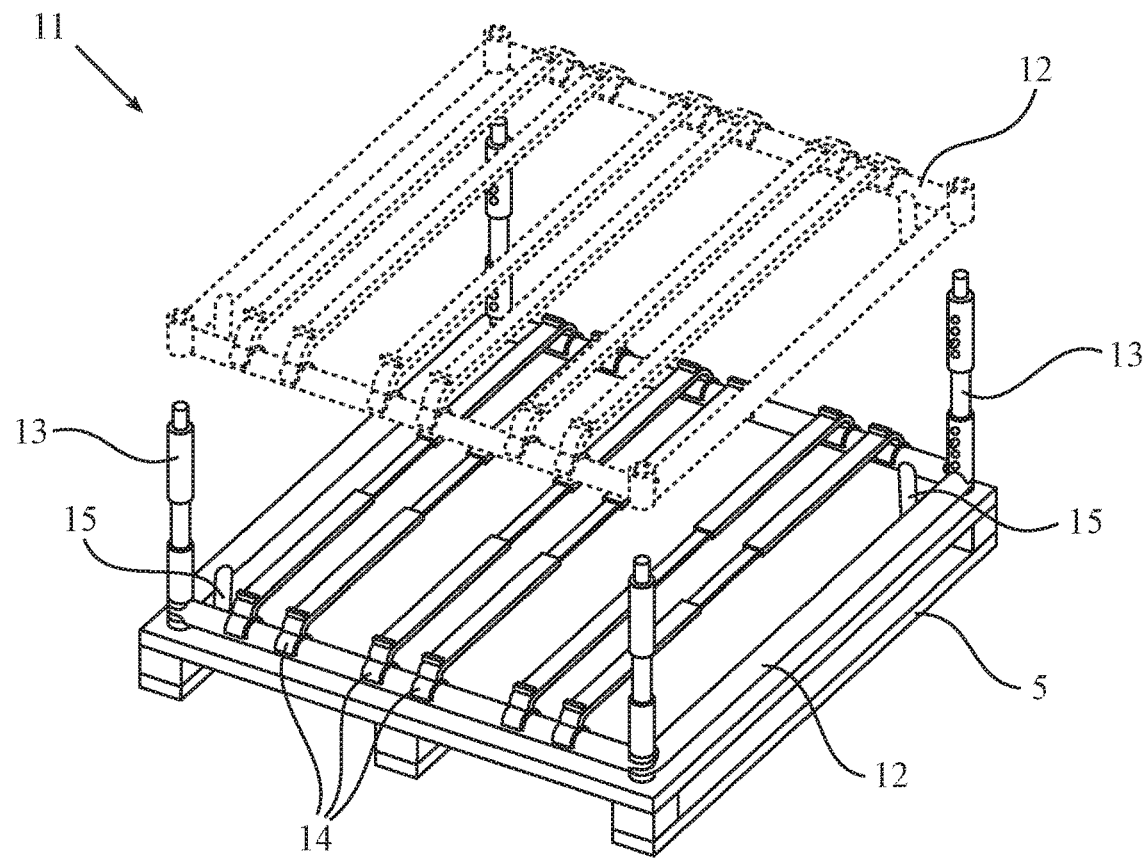
FIG. 3A is a trimetric view of a compartment of a portable rack according to the invention in a second configuration.
Figure 3B:
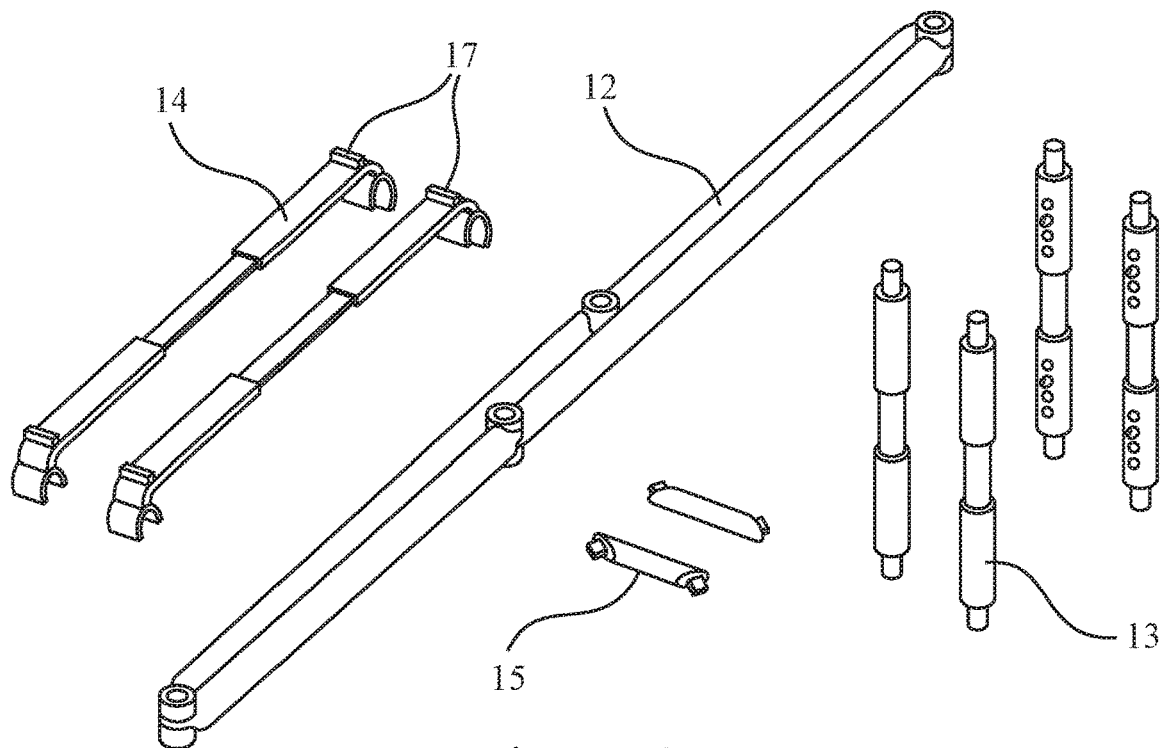
FIG. 3B is a trimetric view of the components of the compartment of FIG. 3A.

A second configuration of a portable rack according to a preferred embodiment of the invention is illustrated in FIGS. 3A and 3B. It is, in effect, a variation of the first configuration, in that it is constructed modularly by compartments. A typical compartment 11 is depicted in FIG. 3A; in this case it is a bottom compartment, resting on a pallet 5. It is generally constructed of rod-shaped structural members, disposed at edges of a three-dimensional rectangular volume, and includes a rectangular base frame 12 and four vertical posts 13. The length of the posts 13 is preferably variable, assuming any of a plurality of values, and these determine the height of the compartment. It is again noted that any one portable rack may include compartments of mutually different heights.

Compartments may be assembled on top of each other, to form a complete portable rack, by attaching the corners of the base frame of an upper compartment (illustrated in FIG. 3A by dotted lines) to the ends of the vertical posts of the lower compartment. The top compartment may be without the vertical posts or with them—possibly topped with a top frame, similar to a bottom frame 12.

FIG. 3B depicts components of a compartment when disassembled. They include components mentioned above, such as base frame 12, vertical posts 13 and carry rails 14. They also include braces 15. Base frame 12 is foldable, as depicted here, for compactness during transportation. When assembled, means are utilized to keep the base frame in rectangular shape, such as braces 15 (see also FIG. 3A). The components are preferably designed for quick manual assembly and disassembly of compartments and complete portable racks—possibly by snap action, without utilizing fasteners, such as screws or bolts. This advantageously enables transporting empty compartments and portable racks back along the supply chain (as explained below) with relatively little required space.

Figure 4A:
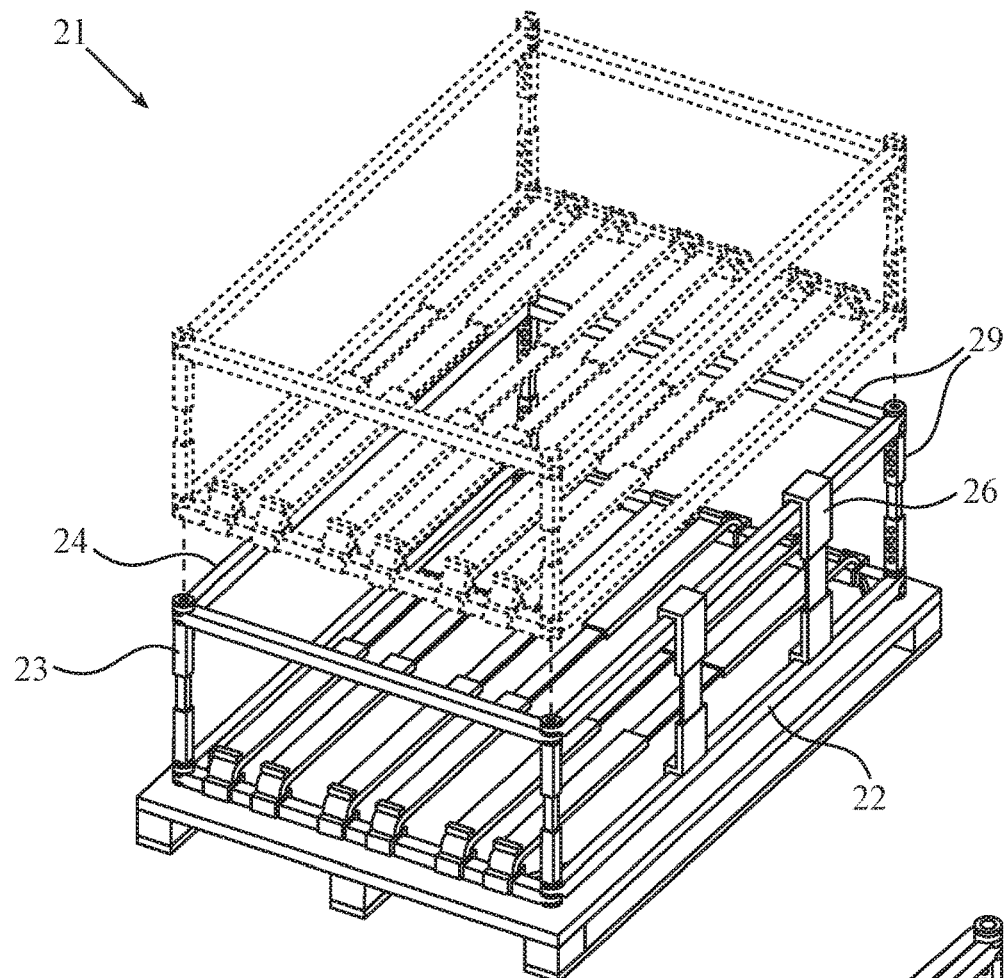
FIG. 4A is a trimetric view of a compartment of a portable rack according to the invention in a third configuration.
Figure 4B:
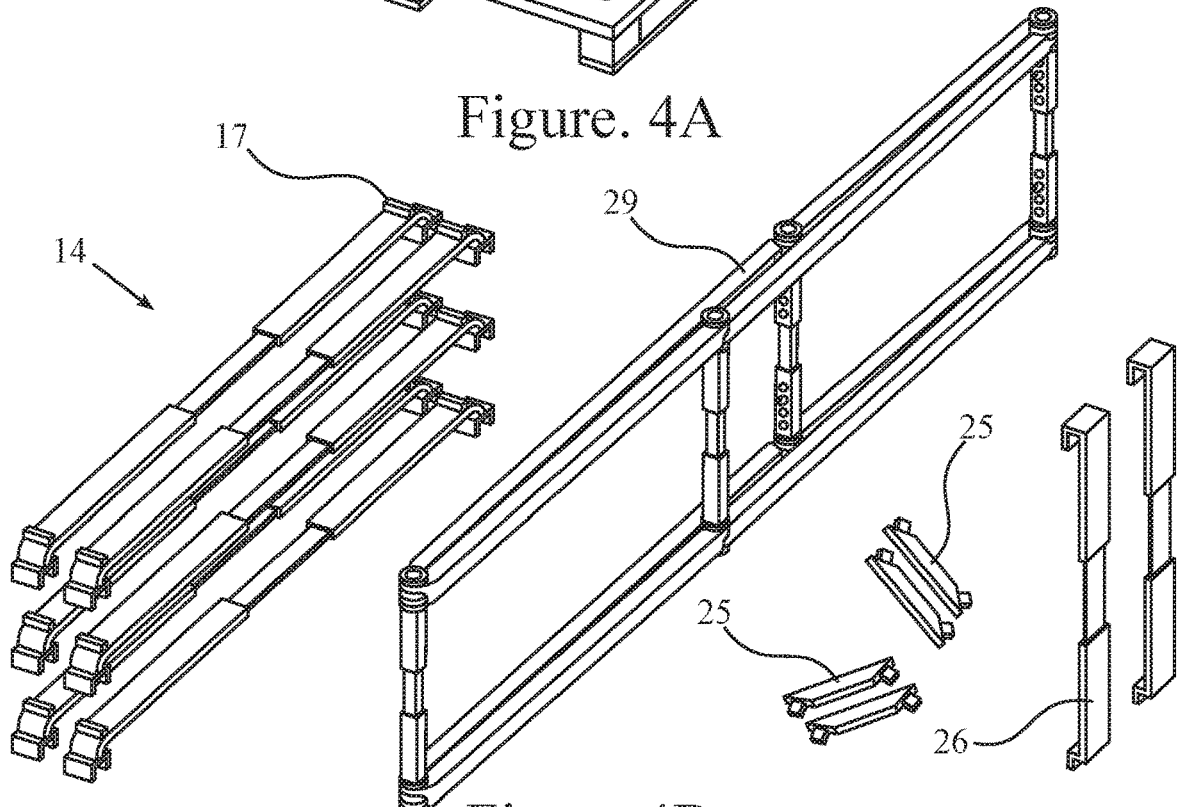
FIG. 4B is a trimetric view of the components of the compartment of FIG. 4A.

FIGS. 4A and 4B depict a compartment 21 of a portable rack in a third configuration—assembled and disassembled, respectively. It is generally similar to that of FIG. 3A, except that it also includes, beside the base frame 22, a top frame 24, attachable to the ends of the vertical posts 23. Each of the horizontal frames 22 and 24 preferably retains its rectangular shape with the aid of corner braces 25. As such, the compartment forms a physically independent unit. A portable rack may be assembled by mounting one compartment on top of another. For this purpose, the corners of the top frame 24 are preferably formed each with a depression, open upward, and the corners of the base frame 22 are formed each with a protrusion, pointing downward; when mounting one compartment on top of another, the protrusions of the base frame of the upper compartment engage the corresponding depressions in the top frame of the lower compartment. As seen in FIG. 4B, the compartment is preferably configured for disassembly, wherein both the base- and top frames are foldable and it is thus possible to fold the compartment frame as a whole, after removing the braces 25. The compartment is further configured for quick manual re-assembly without employing fasteners.

Portable racks such as described above may be used to store and exchange goods in each station of a supply chain, as well as to transport goods between stations, as will be further explained below in conjunction with the system according to the present invention. Suffice it to note, as a particular feature of the invention, that any one portable rack may pass through a plurality of stations—possibly all the way from a supplier or from a consolidation center to a fulfillment center—carrying at least some goods with it on the way. Typically, containers are loaded onto a portable rack at a supplier's warehouse or a consolidation center, as well as at a distribution center (as part of so-called cross-docking operations). Also typically, containers are unloaded from a portable rack at a distribution center (again, as part of cross-docking operations) and possibly at a fulfillment center—as part of local inventory operations.

Most notably though, portable racks of the invention may also be used at a fulfillment center to replace the storage shelves in the order filling facility, by placing them, with their underlying pallets, directly on the floor of the facility. Here the containers (largely as packed by their suppliers), carried by the portable racks, replace the bins and the like that are used in conventional order filling facilities. Any container may be temporarily removed from its compartment, to be accessible for picking product items. In this capacity, the portable rack is adaptable to any type of order filling facility and picking method—be it totally manual, partly mechanized or totally robotic. It is noted that, in an order filling facility provided with a multi-level storage structure (to save floor area) and suitable lifting equipment, such portable racks may also be placed at any of the levels, where their containers would be equally accessible.

portable racks of the third configuration may be used, even more advantageously, for exchanging goods in any of the stations, in that whole compartments may be exchanged, i.e. unloaded from one portable rack and loaded on to another portable rack (cross-docking), when their contents are from a common source and are destined for a common station down the chain; this saves labor.

Turning now to FIG. 5, there is shown schematically, by way of example, a typical supply chain, for supplying consumable goods from suppliers to customers, that underlies the order-filling system of the present invention. In common with conventional E-commerce systems, the supply chain includes various stations, in which goods are temporarily stored and re-directed and transportation routes between them. The stations include regional distribution centers, each supplying goods to the next stations in the chain, namely corresponding local fulfillment centers, which, in turn, pick and pack goods according to individual orders and ship them to the respective customers in their locality. Each regional distribution center receives the goods mostly from the various suppliers (here indicated as "large suppliers")—either directly (if geographically and logistically convenient) or through another distribution center (as indicated by horizontal arrows). Very large suppliers may ship goods directly to some of the fulfillment centers. The present system can however advantageously employ, further up the chain, also consolidation centers, aimed at collecting goods from local suppliers (here referred to as "small suppliers") and shipping them to the regional distribution centers (again, either directly or through another distribution center). The meaning of this is that the system can offer to customers a much greater variety of goods, including so-called delicatessen, home-style specialties, local farm products and products that are provided inherently in a great variety, such as pharmacological products.

Figure 6:
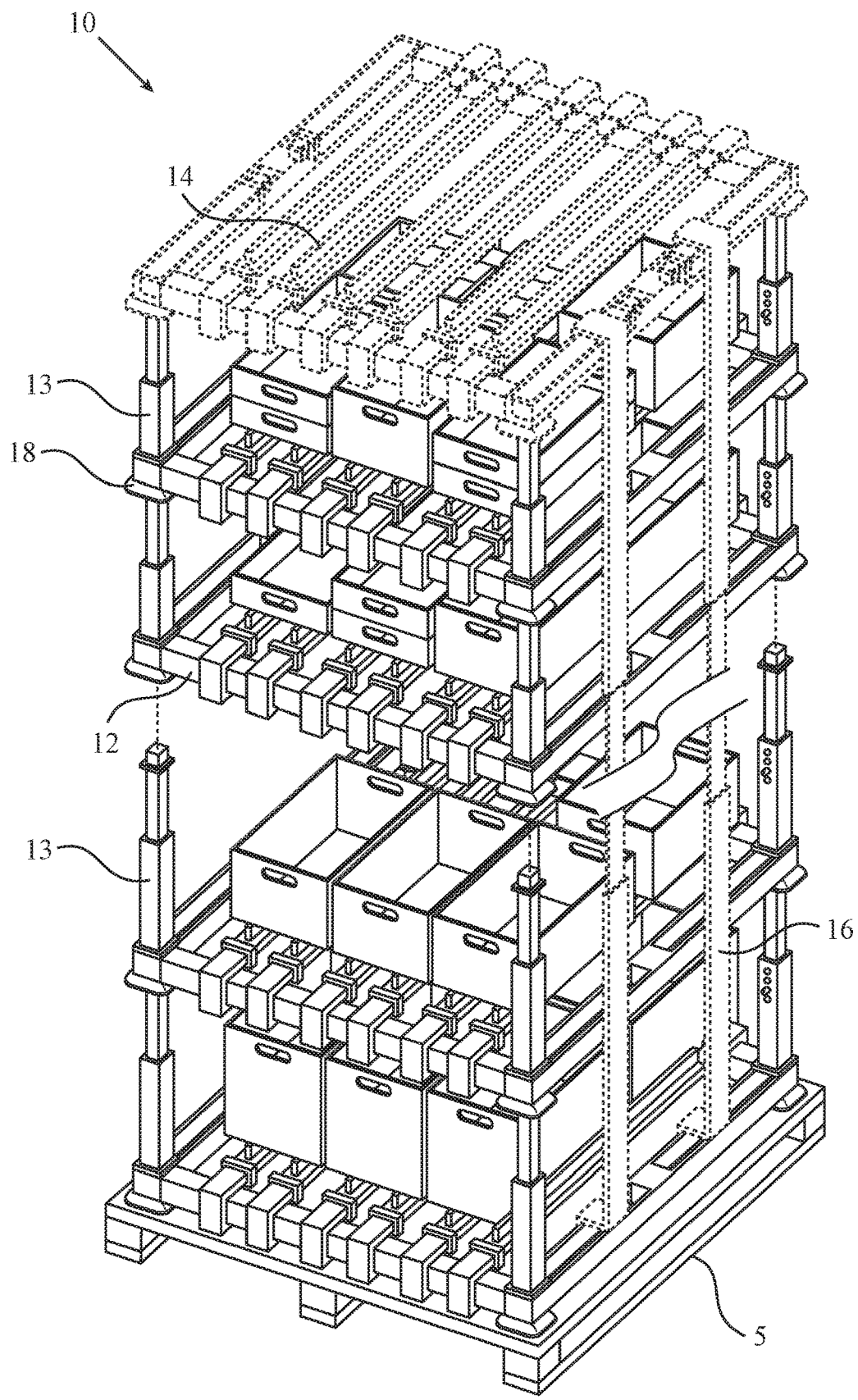
FIG. 6 is a trimetric view of a portable rack according to another embodiment of the invention.

FIG. 6 depicts a typical portable rack 10 in a fully assembled form with components disposed one above the other and filled with containers. As seen, the lowest compartment rests on a pallet 5, such as commonly used for transporting stackable goods. The pallet 5 can be of any size, and the perimeter of the rack is designed to fit such size. As to the height of the final rack and the number of compartments therein—there are no limitations. As illustrated in this figure, four vertical posts 13 are permanently connected to the four corners of the upper surface of each frame 12 via a hinge mechanism, wherein in the upper frame, these four vertical posts 13 are in a folded state and are placed within dedicated grooves within the body of the frame 12.

In addition, FIG. 6 illustrates how the upper two compartments can be lifted away—see wavy stripe in the middle—and transferred to, e.g. a different rack 10 or onto a different pallet 5. After the removal of these upper compartments, it is possible to: (i) place other compartments with different containers directly onto the vertical posts 13 at the remaining compartments; (ii) place a frame 12 onto the vertical posts 13 at the remaining compartments to close the rack 10; or (iii) remove the containers from the now-upper frame 12 and fold (or remove) the four vertical posts 13, thereby creating a rack 10 comprising only the remaining lower compartments (only one compartment in the case of FIG. 6), which can either remain on the pallet 5 or moved to a different pallet or rack. It should be noted that before lifting the compartments, the lateral retention bars 16 needs to be removed, and after any re-assembly of a rack they are returned.

As explained above, guiding elements 18 located-at or assembled-on each corner at the lower surface of each frame 12 are designed to assist in the placing of a compartment or group of compartments onto vertical posts 13 of an existing compartment during compartments' replacement.

Figure 8:
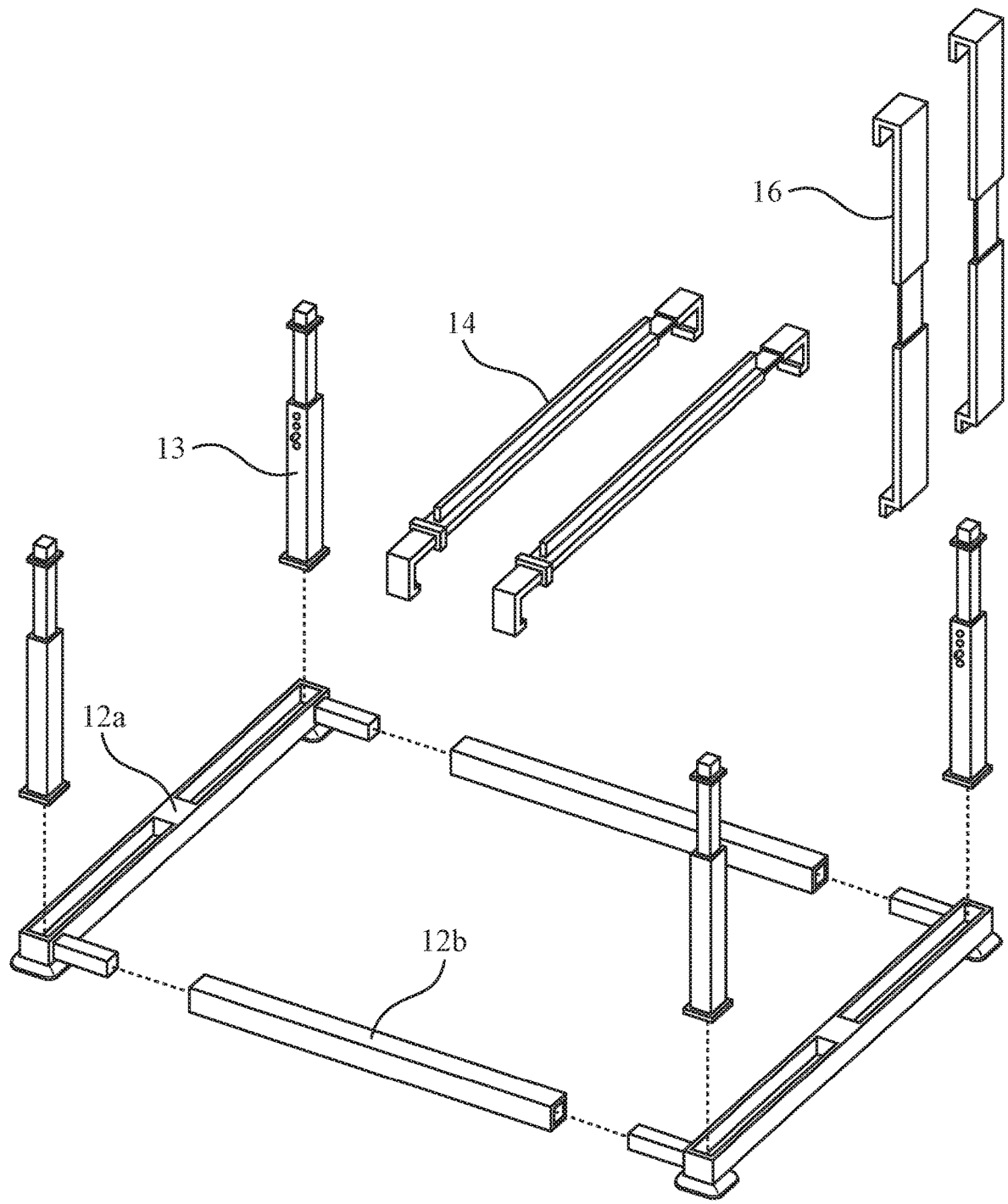
FIG. 8 is a schematic illustration of the assembly and disassembly of a base frame of a compartment of a portable rack according to the invention.

It should also be noted that FIG. 6 illustrates carry rails 14 that are mounted onto the frame 12 by a dedicated ring that completely engulfs two opposite sides/fragments of the frame. Such a configuration allows easy sliding of the carry rails 14 along the frame 12 for adjusting the distance between two carry rails 14 according to the width of the containers to be placed thereon. Notably, such dedicated ring may be either mounted on the frame during assembly of the frame (as illustrated in FIG. 8), or may have an opened and a locked positions, in which the open position allows for mounting the carry rail 14 onto the frame and then when in locked position prevents opening and unintentional removal of the carry rail 14 from the frame 12.

Figure 7:
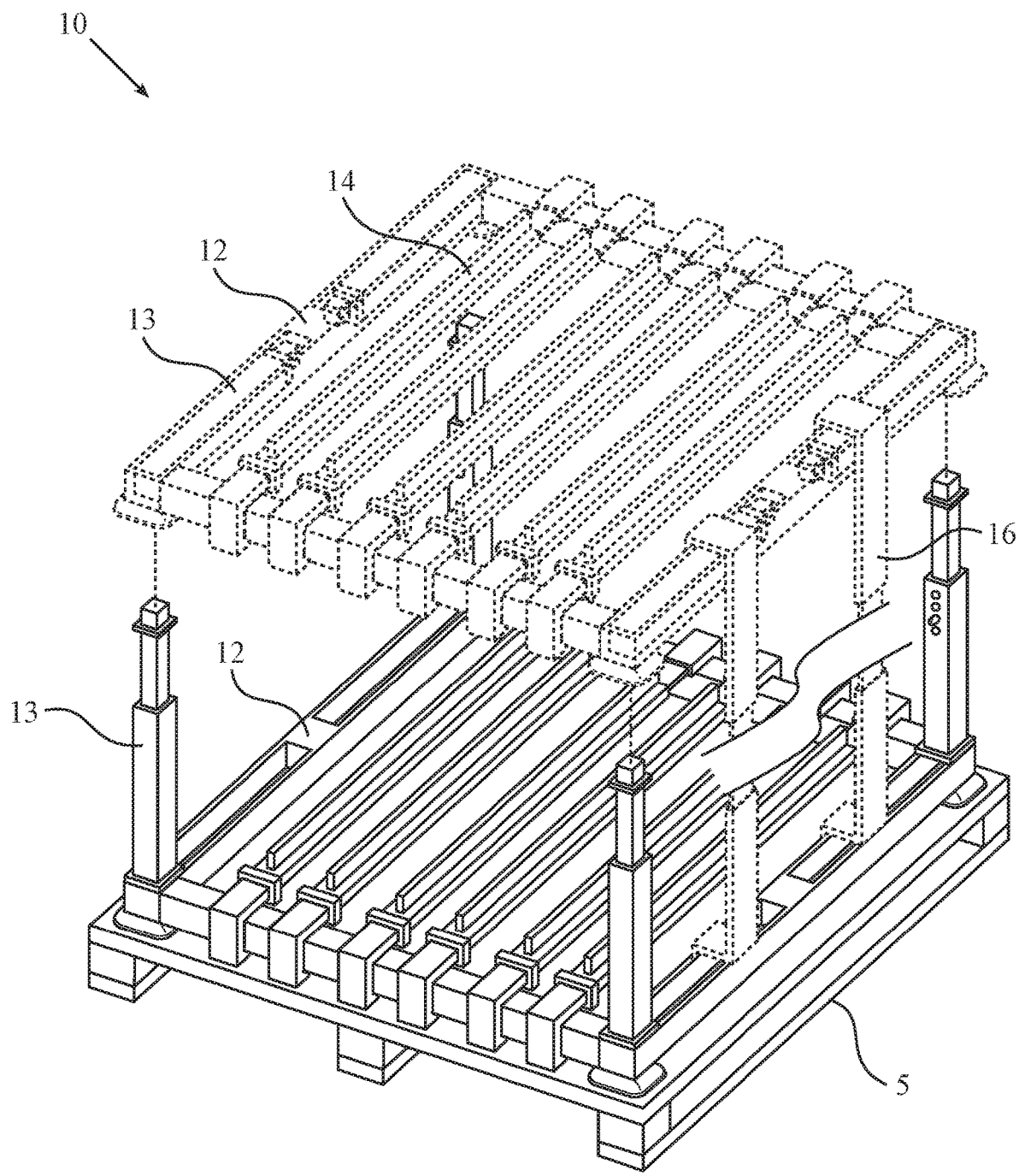
FIG. 7 is a trimetric view of a compartment of a portable rack according to yet another embodiment of the invention.

FIG. 7 illustrates another configuration of a single bottom compartment of a portable rack according to some embodiments of the invention, resting on a pallet 5. As illustrates, the compartment is generally constructed of a bottom square-shaped frame 12 with integrated foldable and extractable vertical posts 13 at the four corners of the frame, and includes three pairs of carry rails 14 mounted thereon. The length of the vertical posts 13 as well as the distance between the carry rails 14, are variable, assuming any of a plurality of values according to the sizes of the containers to be placed in the compartment. It is again noted that any one portable rack 10 may include compartments of mutually different heights. As also illustrated, the upper frame 12 of the compartment also includes such four vertical posts 13 at the four corners, but in this frame they are folded into dedicated groves within the frame.

These vertical posts 13 can be pulled/extracted into an open position in case additional compartment(s) (or another frame) are to be placed onto this compartment.

It should be stressed that although the figures illustrate that the four vertical posts 13 at the four corners are foldable into dedicated groves at the upper surface of the frame 12, the frames can alternatively be constructed such that the four vertical posts 13 folded into dedicated groves at the lower surface of the frame. In either case, the vertical posts 13 when in a folded position may be secured in place by any suitable mechanism to prevent unintentional extraction/opening of the vertical posts 13.

Compartments may be assembled on top of each other, to form a complete portable rack 10, by attaching the corners of the base frame of an upper compartment to the ends of the vertical posts of the lower compartment (or by attaching the corners of the base frame of the lower compartment to the ends of the vertical posts of the upper compartment). The top compartment may be without the vertical posts or with them—possibly topped with a top frame, similar to a bottom frame 12.

FIG. 8 illustrates how a frame 12 according to some embodiments of the invention may be assembled from separated fragments to reach the final assembled frame and finally compartment and rack 10.

Central to the system is a computer network, including a central computer with appropriate software, communication means and terminals (with ancillary wireless I/O devices) at the various stations—having the integrated tasks of (a) tracking all customers orders, (b) tracking inventory at each station, (c) ordering goods from suppliers when out of stock or if in the non-stockable category, (d) directing the flow of goods within the stations (e.g. cross-docking in distribution centers) and between them (transportation) and (e) directing the process of order filling (at the fulfillment centers). An additional task (in common with conventional supply systems) is directing the delivery of packaged filled orders along suitable routes to customers. As the main feature of the currently disclosed system, the central computer is programmed, in conjunction with the integration, or interactivity, of the various tasks mentioned, to carry out fulfillment of customers' orders with maximum efficiency; that is, flow of goods from suppliers throughout the supply chain is continuously controlled so that, on the one hand, all non-stockable products (usually from small suppliers, as defined above) that are currently in outstanding orders are prepared and transported on time and so that, for other products, the inventory at each station, especially at the fulfillment centers, is held to a minimum. The latter task is achieved by directing the shipments from each supplier to each FC to be frequent, while yet retaining efficiency by selecting only products required in the near term (say, 2-3 days) and effectively consolidating shipments from various suppliers over the transport routes. In each case, the process of fulfillment of orders or of maintaining thin but reliable inventory thus begins, in effect, at the supplier level. Beside the resulting efficiency, this process also has the benefit of each item being on the road or in storage for relatively short time—thus retaining freshness, reducing spoilage and wastage and requiring less shelf life of products.

The portable racks of the present invention are cooperative with the computer network in carrying out the outlined tasks, in that they facilitate moving currently targeted containers (i.e. those in current orders—from customers or from inventory controllers), at the shortest time and with minimal handling, from the suppliers to the FC and the order filling facility. They help avoid unnecessary stocking of products at the distribution centers and the fulfillment centers, with the attendant costs of labor and space. In effect they enable starting the process of order filling already at the supplier level and, in many cases, any one portable rack may carry a particular product, in its original container, from the supplier to the picking agent or -device at the order-filling facility.

Typical operation of the system will now be illustrated, pointing out the significant actions in the fulfillment of customers orders.

Within the computer network, inventory of all offered products in all the stations of the supply chain are continuously monitored and all customer orders are centrally registered for tracking. Additionally, the orders are consolidated daily and all currently ordered product items are tagged with identification data regarding suppliers, consolidation centers, distribution centers and fulfillment centers. The ordered quantity of each stockable product is compared with current inventory at each station and when a need is thus indicated, instructions are issued to the appropriate preceding (i.e. supplying) station to ship the required quantity—in a manner to be described in detail below; for orders of non-stockable products, instructions are sent directly to the supplier. It is noted that within a fulfillment center there are actually two stations, namely incoming- or holding storage and the order filling facility; the moving of products from the first to the second station is likewise controlled by the computer network. Execution of the instructions received at each station is monitored with the aid of electronically sensed tags or labels on each container, compartment and portable rack involved in the supply chain; any type of sensing technology may be used, such as optical (bar- or dot codes), magnetic or RFI. The computer network also communicates with trucking control systems—to instruct and monitor transportation between the stations. Instructions for trucking are issued preferably following optimization of routes and of truck loads. Clearly, the computer network performs also other functions, such as accounting vis-à-vis customers and suppliers and issuance of reports.

Typical actions at each type of station will now be described in a non-comprehensive manner, starting with the most remote station and ending with the order filling facility. Reference is again made to FIG. 5.

Instructions for specialty products and other infrequently consumed products arrive at each relevant small supplier, who consequently packs the ordered item units in appropriate containers. It is possible that several different items be placed in any one container addressed to a common FC; in this case, the position of each item within the container is communicated to the computer network. It is furthermore possible that units placed in any one container may come from different suppliers—thus providing for consolidation at the lowest level (which may be useful for very small suppliers). The containers are collected by the local consolidation center, where they may be placed in one or more portable racks at noted positions within noted compartments; The racks are preferably differentiated by their current destination—a distribution center or possibly a FC. In some localities a truck, with an appropriate number of portable racks, may collect goods from current suppliers there, in which case the truck itself serves as the consolidation center and may unload its racks at another consolidation center or directly at a distribution center.

Instructions for supplying more regular products (when needed for stock further down the supply chain) arrive at a warehouse of each relevant supplier. Here product units are usually already packed in containers. A large supplier may ship the required number of containers to one or more distribution centers in a conventional manner. For others, according to the invented system, empty portable racks are present at such a warehouse (having been trucked back—possibly folded—from fulfillment centers). The required number of containers of each ordered product are loaded onto one or more portable racks—preferably differentially according to the destination distribution center or (if the total quantity justifies it) according to the destination fulfillment center. The loaded portable racks are shipped by truck to a distribution center—preferably the nearest one. It is noted that very large suppliers, with frequent large delivery quantities, may ship products directly to fulfillment centers.

At each distribution center instructions for various operations may be followed: First, containers with products that are already in stock at the distribution center may be loaded onto certain portable racks of those received or to new empty portable racks. It is noted that each present portable rack is assigned (addressed) by the computer network to a particular fulfillment center. Next, containers that arrived from large suppliers or from consolidation centers may be transferred (cross-docked) from received portable racks (or possibly also from received batch shipments) onto portable racks destined for (i.e. assigned to) the fulfillment center to which the respective containers are addressed. In other words, every container, regardless of its source, ends up in a portable rack destined for its addressed fulfillment center. When portable racks of the third configuration (see above) are used, entire compartments may also be transferred (cross-docked) between portable racks, if their contents have a common address; this saves labor. An optional operation that may be enabled by the system under control of its computer network, for products of the second type in cases that different product units are packed within one container, is to cross-dock individual units, that is—move units from one container to another according to their destination. The loaded or re-loaded portable racks are then transported to their respective fulfillment centers. If the addressed fulfillment center is in a different region, the portable rack is transported to the corresponding distribution center (per horizontal arrows in FIG. 5) where it is directed to the appropriate fulfillment center. The transfer and reloading of containers, as directed by the computer network, may be carried out manually and/or by various mechanical agents, including robots. It is noted that the compartments of the portable racks are configured for easy loading and unloading of containers by any means. Each transfer action is reported back to the computer network by sensing the respective tags or labels on each container and each compartment. Truckers may similarly report all portable racks received for shipping.

With regard to products of the first type, the computer network is generally operative to control the flow of goods from the suppliers and through the distribution centers so that, for each product, essentially only quantities that are required for current stock at each fulfillment center, as measured by anticipated depletion over a suitable period of time, are transported. This may be achieved at the first leg of the supply chain, inter alia, by consolidating containers of various products from any one supplier into a single shipment—e.g. into a single portable rack—destined to a corresponding distribution center (or possibly a fulfillment center). It may similarly be achieved at the second leg of the supply chain, i.e. at a distribution center, by consolidating containers from various suppliers into any one portable rack, destined for a particular fulfillment center. The advantageous saving of storage space at the latter site is obvious.

At the receiving- or storage area of each fulfillment center, incoming portable racks are sorted: Some of them may be moved directly to the order filling facility and placed at any available floor spot. Others may be temporarily stored; as part of a day's activity, certain containers may be moved from them to the order filling facility—to replace depleted containers in any of the portable racks positioned there. When using portable racks of the third configuration, individual compartments, or stacks of them, may also be thus moved—to replace or be added to (e.g. stacked above) existing compartments in the order filling facility. From time to time, fully or partly empty portable racks or compartments may be moved back from the order filling facility to the storage area. Finally, empty portable racks are periodically folded and shipped back to the suppliers or the distribution centers. All the above operations are monitored and controlled by the computer network.

At the order filling facility, portable racks are placed, with or without their pallets, in rows—each in an available position determined by the computer—so as to be accessible to the picking mechanism. When the facility has a multi-level storage structure, a position for any portable rack may be chosen to be at any level. Since the row number and the (horizontal and possibly vertical) position in the row of each portable rack is known to the computer network, also the location of every specified container is known to it. Each compartment is generally accessible from both its front and its back (which thus face adjacent aisles). Any one portable rack may contain a variety of products (for example, as received from the distribution center) and its placement anywhere along a row (or possibly in any row) is not necessarily subject to product classification. Nevertheless, since the location of every portable rack is known to the computer network, the picking device may be directed to the correct container when filling an order. This concept is known as "dynamic shelving" and has the beneficial effects of reducing required floor space and saving the labor involved in re-stocking and re-arranging of products on shelves, which is typical to conventional fulfillment centers.

The system of the invention is impartial to the manner in which orders are actually filled. Any picking and conveyance scheme (e.g. goods-to-picker or picker-to goods) may be accommodated. Only some adaptation need be made to lift and pull a container out of a compartment and replace it. Also any picking method, whether manual or robotic may be utilized. Units in a container may be accessible for picking from its top or, alternatively, from its front. Notably, an optional feature of the system, mentioned above, namely the identification and recording of the positions of individual units within a container, may be advantageously applied to simplify robotic picking. To wit, the computer network may monitor all units as they are picked, determine the position of the unit to be picked next and convey it to the device so as to aim accordingly—thus obviating the need for a sensor to locate the unit. Obviously, it is imperative that such a scheme be used for rare or specialty products, units of which may be present only in particular locations within the container (as described above). As noted, such products, in a great variety, may be advantageously offered to customers when using this system.

Finally, after orders have been filled and the picked goods have been packaged, the packages are preferably loaded into portable racks of the current invention, each rack designated to a respective delivery route or zone. The racks may then be placed in corresponding trucks for delivery of the packages to customers. The computer network may monitor the location of each package in its rack and the address of the corresponding customer and may instruct the driver accordingly. The use of portable racks in this manner enables compact storage of the packages while retaining convenient accessibility to each one and contributes to the efficiency and reliability of the delivery process.

INDUSTRIAL APPLICABILITY

1. Components of the portable racks of the invention may be manufactured, using commonly known materials, tools and methods. The goods supply chain underlying the invented system, including the fulfillment centers, are known and in use today and require minor modifications for adaptation to the system. The computer network that is at the heart of the invented system may be readily set up from available digital products and communication facilities and only requires appropriate software, which may be programmed with known methods.

The invention claimed is:

1. A rack (10) for holding, transporting, and enabling extracting therefrom stackable containers holding goods, said rack (10) comprising two or more compartments, each compartment comprising:
  a) a rectangular horizontal base frame (12), wherein: said horizontal base frame is designed to serve as a basis for holding said containers, and may serve as a top frame for a compartment located below said compartment;
  b) four or more height adjustable vertical posts (13) designed to connect two adjacent horizontal base frames (12), and adjust the distance therebetween according to the height of said containers; and
  c) a plurality of carry rails (14), mounted on said horizontal base frame (12), serving as basis for carrying said containers, each carry rail (14) adapted to be moved horizontally such that the distance between two adjacent rails (14) is adjustable according to the width of the containers placed thereon;
wherein:
  when assembled, said compartments are adapted to be stacked one on top of the other for holding containers therein, and wherein each compartment or group of stacked compartments can be individually lifted away from the rack (10);
  the heights between the horizontal base frames (12) within an assembled rack (10) may differ across the rack;
  each one of said plurality of carry rails (14) has an upper surface onto which the container(s) is placed, wherein said upper surface is higher than the horizontal base frame (12) onto which the rails are placed, to enable lifting the container on and off therefrom; and
  the distance between two adjacent carry rails (14) may differ between horizontal base frames and within the same horizontal base frame;
  said vertical posts (13) are attachable and detachable to an adjacent horizontal base frame (12), such that each said compartment is detachable from an adjacent compartment, and such that when in use each said compartment can be removed and moved with respect to any of said compartments within said rack; and said compartments are adapted to be individually removable from said rack and capable of being arranged in different orders with respect to other compartments within said rack, and adapted and capable of being removed from said rack and inserted into another rack or another separate location therefrom.

2. The rack (10) of claim 1, further comprising fasteners for affixing the horizontal base frame(s) (12) to the vertical posts (13) and/or affixing one compartment to another.

3. The rack (10) of claim 1, which is adapted to be utilized in a supply chain for consumable goods, for at least two of the following functions: (a) storage of containers containing goods, at any station of the supply chain, (b) consolidation of goods from multiple sources in the supply chain, (c) cross-docking of goods, (d) distribution of goods to any station of the supply chain, (e) picking of goods to fulfil customer orders, and (f) transportation of goods between any of the stations of the supply chain.

4. The rack (10) of claim 3, wherein said set of functions further includes (g) transportation of packed goods from a fulfillment center to a customer's premises.

5. A system for fulfilling shopping orders obtained digitally from consumers, for products offered by a plurality of suppliers, at least one unit of each product being packaged by the respective supplier in a container, the system comprising: (i) at least one distribution center, for receiving pre-packed containers from a plurality of suppliers, (ii) at least one fulfillment center, for receiving said pre-packed containers from said distribution center or directly from a supplier, and for picking units of products from said containers and sending said units to customers according to their respective orders, (iii) a plurality of racks (10) as defined in claim 1, disposed in said distribution centers and in said fulfillment centers and being transportable between them, wherein said pre-packed containers are designed to be placed onto said racks (10) within said compartments, and (iv) a computer network, responsive to said orders from consumers and operative to:
  (a) issue directions to a distribution center, to effect loading into a specified compartment of a specified first rack (10) one or more specified containers or units from a specified compartment of a specified second rack (10) or from a specified batch of containers received from a supplier and to effect shipping said first rack (10) to a specified fulfillment center;
  (b) issue directions to a fulfillment center, to effect locating a specified rack (10) at a specified position, and to effect making a specified container in a specified compartment of a specified rack (10) temporarily accessible for picking a specified number of units therefrom;
  (c) docketing and managing inventory;
  (d) track the identity of such products and of the containers at all times;
  (e) continuously monitor inventory of all offered products in all different stations of a supply chain;
  (f) consolidate shipments from various suppliers over transport routes;
  (g) receive position of each item within the containers; and
  (h) facilitate moving targeted containers, thereby enabling starting a process of order filling already at the supplier level.

6. The system of claim 5, further comprising at least one consolidation center for receiving containers from a plurality of suppliers, wherein said racks (10) are further disposed in said consolidation center, and wherein the computer network is further operative to issue directions to said consolidation center to effect loading into a specified compartment of a specified rack (10) one or more specified containers received from a respective supplier and to effect shipping said rack (10) to a specified distribution center.

7. The system of claim 5, wherein said computer network is further operative to issue directions to any of said suppliers, distribution center, fulfilment center and consolidation center, to move one or more specified containers and/or compartment(s), and/or group of vertically stacked compartments, from a first specified rack (10) to a second specified rack (10) and/or at least one specified container from one compartment to another in the same rack (10).

8. The system of claim 5, wherein the position of each unit or container at a specified compartment is known to the computer network, and the computer network is further operative to issue directions to a fulfillment center to effect picking of at least one specified unit from a specified container.

9. The system of claim 8, wherein each container comprises units of different product type.

10. The rack (10) of claim 1, further comprising a guiding element (18) for assisting in the attachment of each one of said vertical posts (13) to said horizontal base frames (12).

11. The rack (10) of claim 1, wherein when the rack (10) is not assembled, the vertical posts (13) are folded inside the horizontal base frame to save space during storage and transportation, and before assembly, they are extracted.

12. The rack (10) of claim 1, wherein each horizontal base frame (12) is assembled from two pairs of complementary fragments (12a,12b).

13. The rack (10) as defined in claim 1 for use in a supply chain for consumable goods, wherein said supply chain comprises at least two of the following stations: (a) storage of containers containing goods, at any station of the supply chain; (b) consolidation of goods from multiple sources in the supply chain; (c) cross-docking of goods; (d) distribution of goods to any station of the supply chain; (e) picking of goods to fulfil customer orders; and (f) transportation of goods between any of the stations of the supply chain.

14. The rack (10) of claim 13, wherein said supply chain further includes: (g) transportation of packed goods from a fulfillment center to a customer's premises.

* * * * *